(12) United States Patent
Yoneda

(10) Patent No.: US 6,405,559 B1
(45) Date of Patent: Jun. 18, 2002

(54) REFRIGERATING APPARATUS

(75) Inventor: Yuji Yoneda, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/554,508

(22) PCT Filed: Oct. 2, 1998

(86) PCT No.: PCT/JP98/04449

§ 371 (c)(1),
(2), (4) Date: May 17, 2000

(87) PCT Pub. No.: WO99/26028

PCT Pub. Date: May 27, 1999

(30) Foreign Application Priority Data

Nov. 17, 1997 (JP) .............................. 9-314989

(51) Int. Cl.$^7$ ................................. F25B 1/00
(52) U.S. Cl. .............................. 62/513; 62/200; 62/505
(58) Field of Search ........................... 62/513, 113, 199, 62/200, 505, 324.1, 324.6

(56) References Cited

U.S. PATENT DOCUMENTS

| | | | |
|---|---|---|---|
| 4,727,725 A | * 3/1988 | Nagata et al. ............ | 62/513 X |
| 5,095,712 A | * 3/1992 | Narreau .................... | 62/513 X |
| 5,400,609 A | * 3/1995 | Sjoholm et al. .......... | 62/513 X |
| 5,596,878 A | 1/1997 | Hanson et al. | |

FOREIGN PATENT DOCUMENTS

| | | |
|---|---|---|
| EP | 1 026 460 A1 | 8/2000 |
| JP | A6014059 | 1/1985 |
| JP | A6414569 | 1/1989 |
| JP | A1239350 | 9/1989 |
| JP | A418260 | 2/1992 |

* cited by examiner

Primary Examiner—Harry B. Tanner
(74) Attorney, Agent, or Firm—Birch, Stewart, Kolasch & Birch, LLP

(57) ABSTRACT

A refrigerating apparatus is provided with a supercooling circuit 8 having a supercooling heat exchanger 15 provided between a condenser 3 and a main expansion mechanism 9 and an injection circuit 10 for injecting a gas refrigerant from the supercooling heat exchanger 15 into an intermediate-pressure portion 1$a$ of a compressor 1. A motorized expansion valve 16 is provided in a supercooling pipe that diverges from the main flow on the upstream P1 side of the supercooling heat exchanger 15 and reaches the supercooling. heat exchanger 15. By completely closing the motorized expansion valve 16, the injection operation of the injection circuit 10 can be turned off. The degree of supercooling of the supercooling circuit 8 and the amount of injection of the injection circuit 10 can be set to desired values by controlling the motorized expansion valve 16 to a specified degree of opening. The supercooling circuit and the injection circuit can be controlled with reduced noises at low cost.

6 Claims, 8 Drawing Sheets

$0.2 \leq X \leq 0.3$

REFRIGERATING APPARATUS

This application is the national phase under 35 U.S.C. § 371 of PCT International Application No. PCT/JP98/04449 which has an International filing date of Oct. 2, 1998, which designated the United States of America.

TECHNICAL FIELD

The present invention relates to a refrigerating apparatus provided with an injection circuit.

BACKGROUND ART

Conventionally, as a refrigerating apparatus of this type, there has been one shown in FIG. 8. This refrigerating apparatus has a main circuit 57 in which a compressor 51, a condenser 52, a supercooling heat exchanger 53, a main expansion valve 54, an evaporator 55 and an accumulator 56 are connected in series.

A branch pipe 60 that branches from the main circuit 57 between the condenser 52 and the supercooling heat exchanger 53 is connected to an inner pipe 53A of the supercooling heat exchanger 53.

This inner pipe 53A extends from the downstream side to the upstream side inside an outer pipe 61 and is connected to an injection pipe 62. The branch pipe 60 has a mechanical expansion valve 63, and the degree of opening of this mechanical expansion valve 63 is changed by a signal from a thermosensitive tube 65. attached to the injection pipe 62.

The injection pipe 62 is connected to an intermediate-pressure portion 51A of the compressor 51. The injection pipe 62 has a solenoid controlled valve 66. By opening and closing this solenoid controlled valve 66, the injection of a gas refrigerant to the compressor 51 is turned on and off.

This refrigerating apparatus is improved in refrigerating efficiency by supercooling the refrigerant that is directed from the condenser 52 toward the main expansion valve 54 by a supercooling circuit constructed of the supercooling heat exchanger 53, the branch pipe 60 and the mechanical expansion valve 63. The refrigerating efficiency is further improved by injecting the branching refrigerant, which has absorbed heat in the supercooling heat exchanger 53 and comes from the branch pipe 60, from the injection pipe 62 into the intermediate-pressure portion 51A of the compressor 51.

It is sometimes better for the improvement in efficiency to send the whole refrigerant to the evaporator 55 without making the main-stream refrigerant branch into the branch pipe 60. In this case, the solenoid controlled valve 66 is closed so as to operate neither the supercooling circuit nor the injection circuit. It is to be noted that the mechanical expansion valve 63 cannot completely be closed due to its mechanism.

However, according to the aforementioned conventional refrigerating apparatus, noises occur due to the opening and closing of the solenoid controlled valve 66 provided for turning on and off the injection circuit, and this leads to the particular problem that noises are caused by the chattering at the time of change in pressure.

Furthermore, the provision of the solenoid controlled valve 66 only for turning on and off the injection circuit disadvantageously causes cost increase.

Next, FIG. 10 shows the refrigerant circuit of another conventional refrigerating apparatus. This refrigerant circuit is provided with a main refrigerant circuit 210 in which a compressor 201, a four-way control valve 202, an outdoor heat exchanger 203, a first expansion valve 205, a gas-liquid separator 206, a second expansion valve 207 and an indoor heat exchanger 208 are connected in series. This refrigerant circuit is further provided with a bypass circuit 211 for connecting the ceiling of the gas-liquid separator 206 to an intermediate-pressure portion 201a of the compressor 201. This bypass circuit 211 has a solenoid controlled valve 212. In this prior art example, the four-way control valve 202 makes a communication path indicated by the dashed lines during heating to execute a heating operation using the indoor heat exchanger 208 as a condenser. If the solenoid controlled valve 212 is opened during this heating, then a gas refrigerant from the gas-liquid separator 206 is made to pass through the bypass circuit 211 and injected into the intermediate-pressure portion 201a of the compressor 201. As described above, it is sometimes the case where the amount of refrigerant flowing through the indoor heat exchanger 208 that is operating as a condenser is increased by bypassing the first expansion valve 205 and the outdoor heat exchanger 203 and returning the gas refrigerant from the bypass circuit 211 to the compressor 201, for the improvement in efficiency.

FIG. 9 shows the above heating operation expressed by Mollier chart. As expressed by this Mollier chart, a flow rate Gc in the indoor heat exchanger 208 that serves as a condenser is the sum (Ge+Gi) of a flow rate Ge in the outdoor heat exchanger 203 that serves as an evaporator and a flow rate Gi through the bypass circuit 211. If the whole gas is injected from the gas-liquid separator 206 into the compressor 201, then the flow rate Gi of gas injection becomes (Gc×X). In this case, X represents the dryness (0.2 to 0.3, for example) of the refrigerant at the exit of the expansion valve 207. Therefore, the flow rate Gc in the indoor heat exchanger 208 becomes Gc=Ge/(1−X).

If frost is formed on the outdoor heat exchanger 203 in this heating operation, then a reverse-cycle defrosting operation is executed. That is, the four-way control valve 202 is switched over to make the communication path indicated by the solid lines, by which the outdoor heat exchanger 203 is operated as a condenser to melt the frost. Then, by opening the solenoid controlled valve 212 also in this reverse-cycle defrosting operation, it is enabled to return the gas refrigerant from the bypass circuit 211 to the compressor 201, increase the amount of refrigerant that is circulating from the compressor 201 to the outdoor heat exchanger 203 and rapidly melt the frost on the outdoor heat exchanger 203.

However, during this reverse-cycle defrosting operation, as shown in FIG. 11, the dryness at the exit of the expansion valve 205 is small (for example, X=0.1 or smaller), when the gas component of the refrigerant is little. For this reason, the circulating refrigerant has increased less in amount even if the gas injection is executed during the defrosting operation, and this has resulted in little effect on reducing the defrosting time.

DISCLOSURE OF THE INVENTION

Accordingly, the first object of the present invention is to provide a low-noise low-cost refrigerating apparatus capable of controlling the supercooling circuit and the injection circuit. The second object of the present invention is to provide a refrigerating apparatus capable of reducing the defrosting time.

In order to achieve the above objects, the present invention provides a refrigerating apparatus that includes a compressor, a condenser, a main expansion mechanism, an evaporator and a supercooling circuit having a supercooling heat exchanger provided between the condenser and the main expansion mechanism and includes an injection circuit for injecting a gas refrigerant from the supercooling heat exchanger into an intermediate-pressure portion of the compressor, the apparatus comprising:

a motorized expansion valve provided in a supercooling pipe that diverges from a main flow on the upstream side of the supercooling heat exchanger and reaches the supercooling heat exchanger.

In this refrigerating apparatus, the injecting operation of the injection circuit can be turned off by completely closing the motorized expansion valve. The degree of supercooling of the supercooling circuit and the amount of injection of the injection circuit can be set to the desired values by controlling the degree of opening of the motorized expansion valve to the desired degree of opening.

That is, according to this refrigerating apparatus, the motorized expansion valve plays the role of the prior art solenoid controlled valve and the role of the prior art mechanical expansion valve. This can obviate the need for the solenoid controlled valve, enabling the elimination of noises occurring in opening and closing the solenoid controlled valve or, in particular, the chattering noises. Furthermore, cost reduction can be achieved since the solenoid controlled valve is not needed. Therefore, according to this invention, the supercooling circuit and the injection circuit can be linearly controlled with reduced noises at low cost.

An embodiment comprises a first opening control section for setting the motorized expansion valve to a small degree of opening close to a completely closed state when the injection circuit is substantially stopping its operation.

In the refrigerating apparatus of this embodiment, by slightly opening the injection use motorized expansion valve even when the injecting operation is not executed, the possible generation of a clearance volume (dead space) can be prevented to enable the prevention of the reduction in volumetric efficiency of the compressor.

Another embodiment comprises a rectifier circuit for flowing the refrigerant sequentially into the condenser, the supercooling heat exchanger and the main expansion mechanism both in a cooling operation and a heating operation.

In this refrigerating apparatus, the refrigerant can be made to flow sequentially into the condenser, the supercooling heat exchanger and the main expansion mechanism by the rectifier circuit both in the cooling operation and the heating operation. Therefore, the supercooling and the gas refrigerant injection can be executed in both the cooling operation and the heating operation, enabling an improvement in efficiency.

An embodiment comprises a second opening control section for controlling the degree of opening of the motorized expansion valve to increase or decrease the degree of opening according to a refrigerant temperature of the injection circuit.

In this refrigerating apparatus, the injection flow rate is increased by increasing the degree of opening of the injection use motorized expansion valve when the injection flow rate is small, and the injection flow rate is reduced by decreasing the degree of opening of the injection use motorized expansion valve when the injection flow rate is great, by which the injection flow rate can be invariably maintained at the desired value.

One aspect of the present invention provides a refrigerating apparatus that includes a compressor, a four-way control valve, an outdoor heat exchanger, a main expansion mechanism and an indoor heat exchanger and executes a reverse-cycle defrosting operation, the apparatus comprising:

a liquid injection circuit for injecting a liquid refrigerant from the outdoor heat exchanger into the compressor during the reverse-cycle defrosting by bypassing the main expansion mechanism and the indoor heat exchanger.

In this refrigerating apparatus, the liquid refrigerant is injected into the compressor during defrosting by the liquid injection circuit. Accordingly, the amount of circulation of the compressor can be still more increased than in the case of gas injection. Therefore, the frost can be melted in a short time, allowing the defrosting time to be reduced.

Another aspect of the present invention provides a refrigerating apparatus that includes a compressor, a condenser, a main expansion mechanism, an evaporator and a supercooling circuit provided between the condenser and the main expansion mechanism and includes an injection circuit for injecting a gas refrigerant from the supercooling circuit into an intermediate-pressure portion of the compressor, the apparatus comprising:

a motorized expansion valve provided in a supercooling pipe that diverges from a main flow on the upstream side of the supercooling circuit and reaches the supercooling circuit.

In this refrigerating apparatus, the injecting operation of the injection circuit can be turned off by completely closing the motorized expansion valve. The degree of supercooling of the supercooling circuit and the amount of injection of the injection circuit can be set to the desired values by controlling the degree of opening of the motorized expansion valve to the desired degree of opening. That is, according to this refrigerating apparatus, the motorized expansion valve plays the role of the prior art solenoid controlled valve and the role of the prior art mechanical expansion valve. This can obviate the need for the solenoid controlled valve, enabling the elimination of noises occurring in opening and closing the solenoid controlled valve or, in particular, the chattering noises. Furthermore, cost reduction can be achieved since the solenoid controlled valve is not needed. Therefore, according to this invention, the supercooling circuit and the injection circuit can be linearly controlled with reduced noises at low cost.

One embodiment comprises a control means for turning on an injecting operation of the injection circuit by opening the motorized expansion valve when the compressor comes to have an operating frequency being not lower than a specified operating frequency.

In this refrigerating apparatus, the injecting operation is turned on when the operating frequency of the compressor is set to the frequency being not lower than the specified operating frequency. Therefore, efficient injection can be achieved with the amount of circulating refrigerant increased to a specified amount or more.

BEST MODE FOR CARRYING OUT THE INVENTION

Figure 1A:
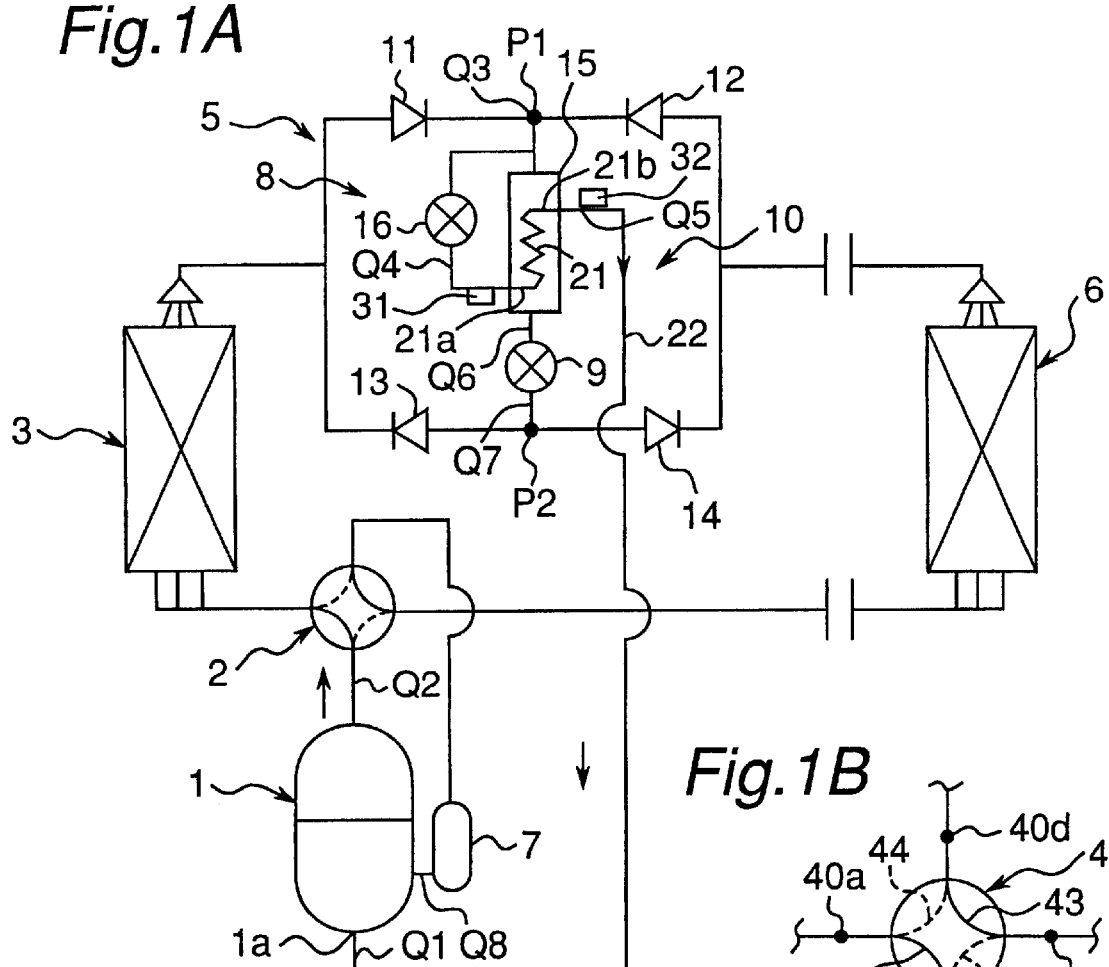
FIG. 1A is a circuit diagram of an air conditioner refrigerant circuit according to a first embodiment of the refrigerating apparatus of the present invention.

The present invention will be described in detail below on the basis of the embodiments shown in the drawings.

First Embodiment

FIG. 1A shows an air conditioner according to the first embodiment of the refrigerating apparatus of the present invention. This first embodiment has a refrigerant circuit in which a compressor 1, a four-way control valve 2, an outdoor heat exchanger 3, a rectifier circuit 5 and an indoor heat exchanger 6 are successively connected. The indoor heat exchanger 6 is connected to the inlet side of the compressor 1 via an accumulator 7.

The rectifier circuit 5 is a circuit in which a series connection circuit of first and second check valves 11 and 12 and a series connection circuit of third and fourth check valves 13 and 14 are connected parallel to each other. The first check valve 11 and the second check valve 12 are connected to each other so that the forward directions thereof are directed toward their junction P1, while the third check valve 13 and the fourth check valve 14 are connected to each other so that the reverse directions thereof are directed toward their junction P2.

Then, a supercooling circuit 8, a main motorized valve 9 and an injection circuit 10 are connected between the junctions P1 and P2 of the rectifier circuit 5.

The supercooling circuit 8 is constructed of a supercooling heat exchanger 15 and an injection use motorized expansion valve 16. The supercooling heat exchanger 15 is connected between the junction P1 and the main motorized valve 9. The injection use motorized expansion valve 16 is provided on a pipe diverging from the junction P1 and is connected to an inlet 21a of an inner pipe 21 located inside the supercooling heat exchanger 15. Then, this inner pipe 21 has an outlet 21b connected to an injection pipe 22. This injection pipe 22 is connected to an intermediate-pressure portion 1a of the compressor 1.

Figure 2:
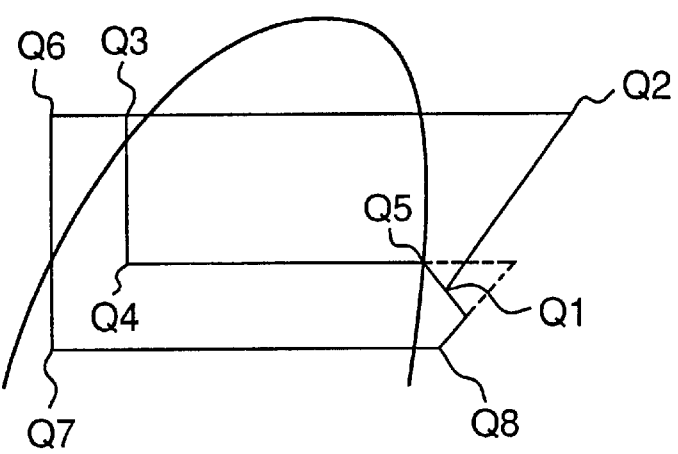
FIG. 2 is a Mollier chart for explaining the operation of the above air conditioner.

The basic operation of the air conditioner having the above construction will be described next. It is to be noted that FIG. 2 shows the states at the points Q1 through Q8 of the refrigerant circuit of FIG. 1A on a Mollier chart. First, if the four-way control valve 2 is positioned in the cooling position as indicated by the solid lines in FIG. 1A, then the refrigerant discharged from the compressor 1 is condensed by the outdoor heat exchanger 3 and flows into the first check valve 11 of the rectifier circuit 5 so as to branch into a sub-stream to the injection use motorized expansion valve 16 and a main stream to the supercooling heat exchanger 15 at the junction P1. The main stream is supercooled by the supercooling heat exchanger 15 and, after being expanded in the main motorized valve 9, the main stream reaches the indoor heat exchanger 6 through the junction P2 and the fourth check valve 14. Then, the main stream evaporated in the indoor heat exchanger 6 returns to the inlet side of the compressor 1 by way of the four-way control valve 2 and the accumulator 7.

On the other hand, the sub-stream is expanded in the injection use motorized expansion valve 16 and, after absorbing heat while passing through the inner pipe 21 of the supercooling heat exchanger 15, the sub-stream is injected into the intermediate-pressure portion 1a of the compressor 1 through the injection pipe 22.

If the four-way control valve 2 is positioned in the heating position as indicated by the dashed lines in FIG. 1A, then the refrigerant discharged from the compressor 1 is condensed by the indoor heat exchanger 6 and flows into the second check valve 12 of the rectifier circuit 5 so as to branch into the sub-stream to the injection use motorized expansion valve 16 and the main stream to the supercooling heat exchanger 15 at the junction P1. The main stream is supercooled by the supercooling heat exchanger 15 and thereafter expanded in the main motorized valve 9 to reach the outdoor heat exchanger 3 through the junction P2 and the third check valve 13. Then, the main stream evaporated in the outdoor heat exchanger 3 returns to the inlet side of the compressor 1 by way of the four-way control valve 2 and the accumulator 7. On the other hand, the sub-stream is expanded in the injection use motorized expansion valve 16 and, after absorbing heat while passing through the inner pipe 21 of the supercooling. heat exchanger 15, the sub-stream is injected into the intermediate-pressure portion 1a of the compressor 1 through the injection pipe 22.

As described above, according to this first embodiment, the supercooling and the injection of gas refrigerant into the intermediate-pressure portion 1a of the compressor 1 can be executed both in the cooling operation and the heating operation by the operation of the rectifier circuit 5. Therefore, the efficiency can be improved by the supercooling and the gas injection in both the cooling and heating operations.

Furthermore, according to this first embodiment, by totally closing the injection use motorized expansion valve 16, the injecting operation of the injection circuit 10 can be turned off. Furthermore, the degree of supercooling of the supercooling circuit 8 and the amount of injection of the injection circuit 10 can be set to the desired values by controlling the degree of opening of the motorized expansion valve 16 to the desired degree of opening.

That is, according to this first embodiment, the motorized expansion valve 16 plays the role of the prior art solenoid controlled valve and the role of the prior art mechanical expansion valve. This can obviate the need for the solenoid controlled valve, enabling the elimination of noises occurring in opening and closing the solenoid controlled valve or, in particular, the chattering noises. Furthermore, cost reduction can be achieved since the solenoid controlled valve is not needed. Therefore, according to this embodiment, the supercooling circuit 8 and the injection circuit 10 can be linearly controlled with reduced noises at low cost. By linearly controlling the degree of supercooling and the amount of gas injection, the efficiency can be maximized.

Figure 3:
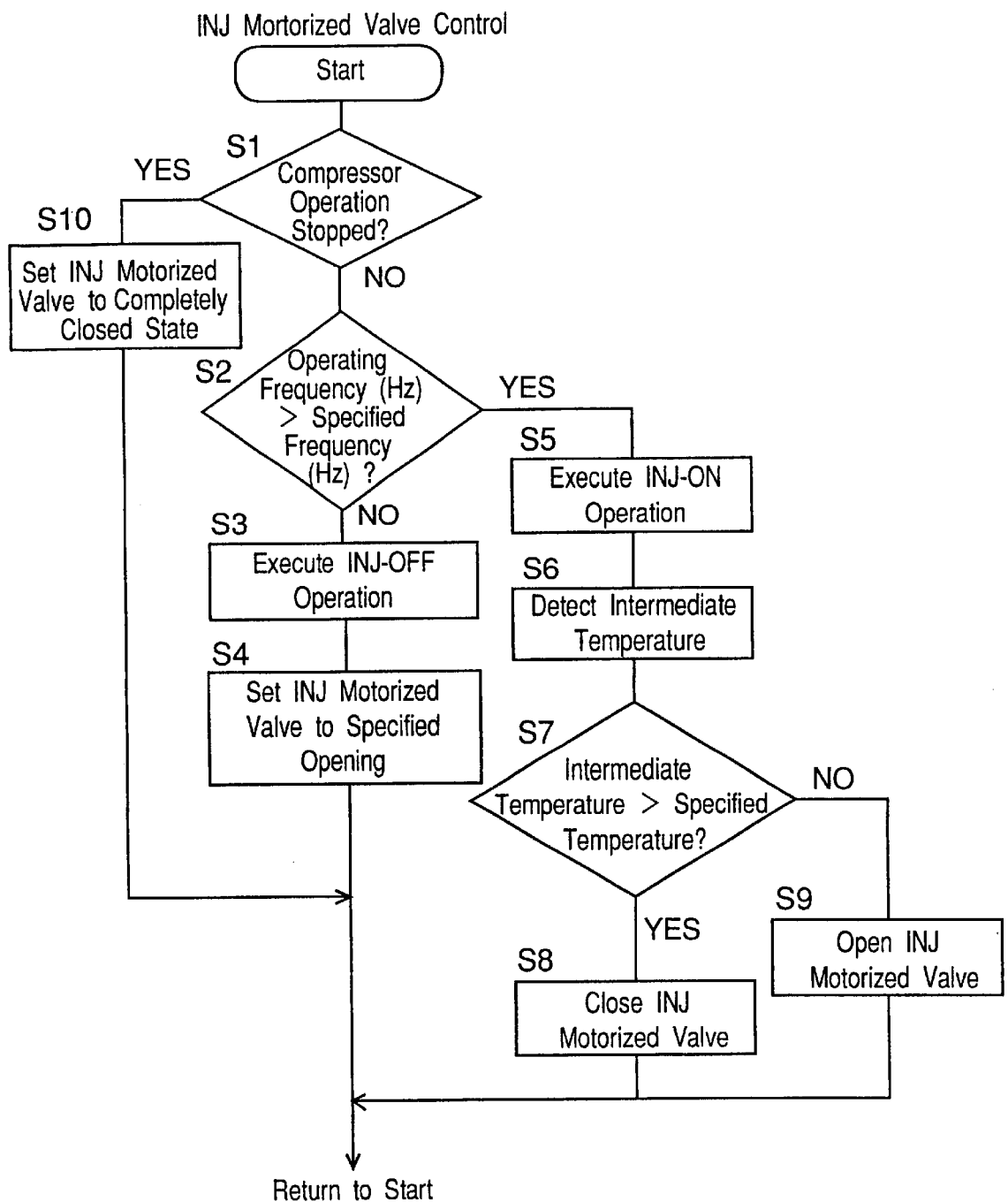
FIG. 3 is a flowchart for explaining the control operation of the injection use motorized expansion valve of the above air conditioner.

The control operation of the injection use motorized expansion valve 16 of this first embodiment will be described next with reference to the flowchart of FIG. 3. It is to be noted that a microcomputer (not shown) was used as an apparatus for executing this control.

First, it is determined in step S1 whether or not the compressor 1 is stopped. If it is determined that the compressor 1 is stopped, then the program flow proceeds to step S10 to completely close the injection use motorized expansion valve 16. As described above, by completely closing the motorized expansion valve 16 when the compressor 1 is stopped, the refrigerant is prevented from staying in the compressor 1 and dissolving into the refrigerating machine oil (the so-called refrigerant dissolution) while the compressor 1 is stopped, enabling easy restarting.

If it is determined that the compressor 1 is operating, then the program flow proceeds to step S2 to determine whether or not the operating frequency of the compressor 1 is higher than a specified frequency. If it is determined that the operating frequency is higher, then the program flow proceeds to step S5 to open the injection use motorized expansion valve 16 and operate the supercooling circuit 8 and the injection circuit 10. By this operation, effective injection can be achieved in a state in which the amount of circulating refrigerant is increased to a specified amount or more.

Next, the program flow proceeds to step S6 to detect the intermediate temperature of the refrigerant of the sub-stream that is directed toward the injection pipe 22 by a signal from a thermistor 31 mounted on the refrigerant pipe located between the injection use motorized expansion valve 16 and the inlet 21a of the inner pipe 21. It is to be noted that this intermediate temperature may be detected by a thermistor 32 attached to the injection pipe 22 near the outlet 21b of the inner pipe 21. Next, the program flow proceeds to step S7 to determine whether or not the intermediate temperature is higher than the specified temperature. If it is determined that the intermediate temperature is higher than the specified temperature, then the program flow proceeds to step S8 to reduce the degree of opening of the injection use motorized expansion valve 16 and returns to the start. If it is determined that the intermediate temperature is not higher than the specified temperature, then the program flow proceeds to step S9 to increase the degree of opening of the injection use motorized expansion valve 16 by a specified degree of opening and returns to the start. The above steps S6, S7, S8 and S9 constitute the second opening control section.

With this arrangement, the degree of opening of the injection use motorized expansion valve 16 is increased to increase the injection flow rate when the injection flow rate is small (when the intermediate temperature is low), and the degree of opening of the injection use motorized expansion valve 16 is decreased to reduce the injection flow rate when the injection flow rate is great (when the intermediate temperature is high) for the reduction of injection flow rate. By this operation, the injection flow rate can be invariably maintained at the desired value.

If it is determined in step S2 that the operating frequency of the compressor 1 is not higher than the specified frequency, then the program flow proceeds to step S3 to close the injection use motorized expansion valve 16 to stop the operations of the supercooling circuit 8 and the injection circuit 10. Next, the program flow proceeds to step S4 to set the degree of opening of the injection use motorized expansion valve 16 to a specified degree of opening and returns to the start. The above steps S2, S3 and S4 constitute the first opening control section. As described above, by slightly opening the injection use motorized expansion valve 16 even when the injecting operation is not executed, the possible generation of a clearance volume (dead space) is prevented to prevent the reduction in volumetric efficiency of the compressor 1.

Figure 1B:
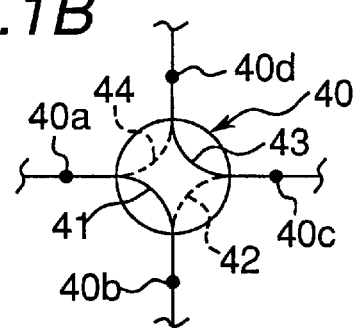
FIG. 1B is a modification example of the rectifier circuit of the first embodiment.

Although the rectifier circuit 5 is constructed of the four check valves in this first embodiment, the circuit may be constructed of a four-way control valve 40 as shown in FIG. 1B. In this case, it is proper to connect a first end 40a of the four-way control valve 40 to the outdoor heat exchanger 3, connect a second end 40b to the junction P1, connect a third end 40c to the indoor heat exchanger 6 and connect a fourth end 40d to the junction P2. Then, the paths indicated by the solid lines 41 and 43 of the four-way control valve 40 are formed as shown in FIG. 1B in the cooling operation and the paths indicated by the dashed lines 42 and 44 of the four-way control valve 40 are formed as shown in FIG. 1B in the heating operation. By this operation, the refrigerant from the condenser can be made to flow sequentially from the supercooling heat exchanger 15 to the main motorized valve 9 both in the cooling operation and the heating operation.

Although the supercooling circuit 8 is provided with the supercooling heat exchanger 15 in the above first embodiment, it is acceptable to connect two refrigerant pipes that extend roughly parallel to each other by a heat exchanger plate in place of the supercooling heat exchanger 15, connect one refrigerant pipe to the main stream circuit and connect the other refrigerant pipe to the sub-stream circuit.

Second Embodiment

Figure 4:
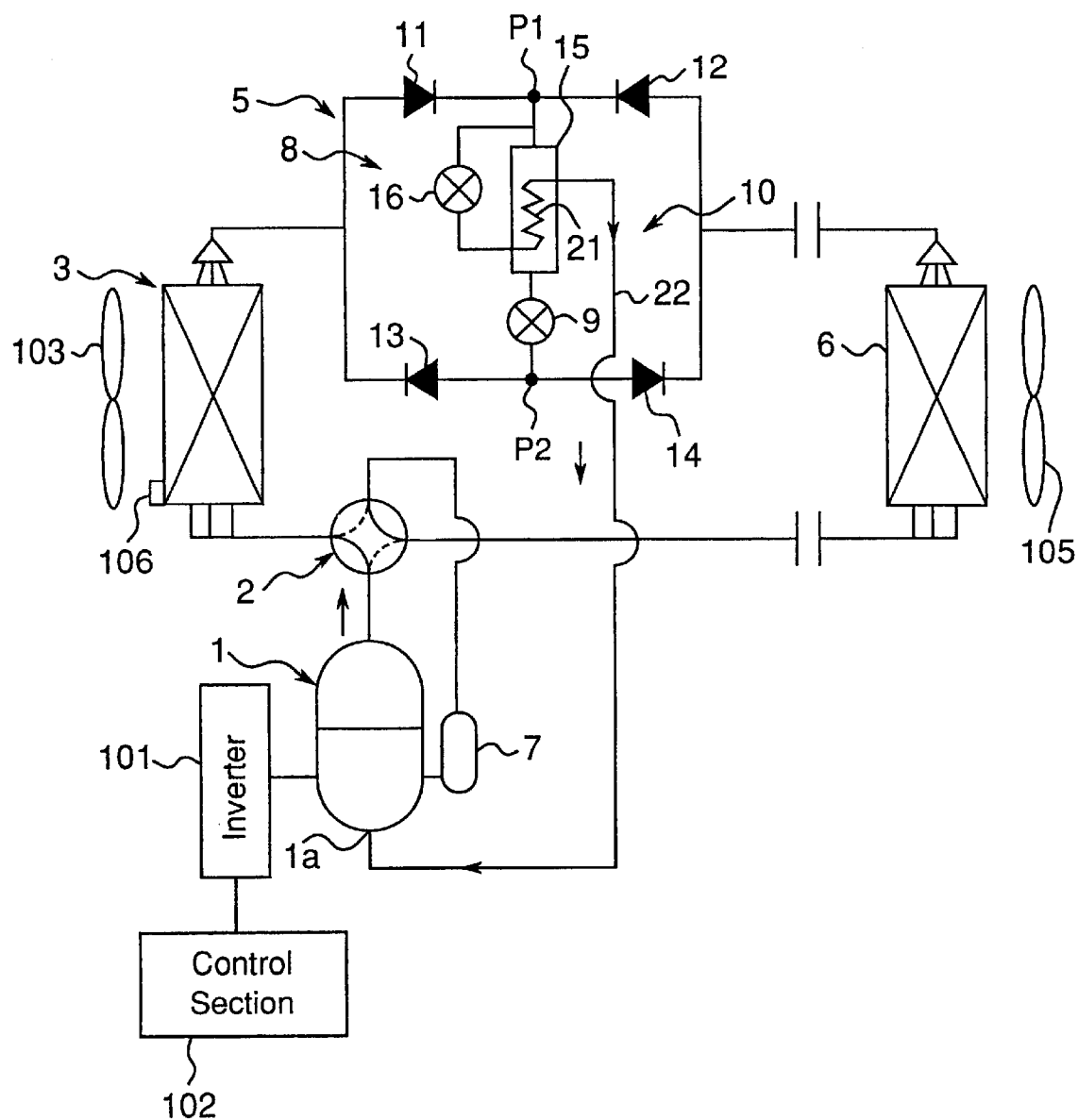
FIG. 4 is a circuit diagram of an air conditioner refrigerant circuit according to a second embodiment of the refrigerating apparatus of the present invention.

Next, FIG. 4 shows a refrigerant circuit according to the second embodiment of the refrigerating apparatus of the present invention. This second embodiment has the same refrigerant circuit as that of the first embodiment shown in FIG. 1 and is different from the first embodiment in that an inverter 101 for controlling the output of the compressor 1 and a control section 102 for controlling this inverter 101 are provided. Therefore, this second embodiment will be described putting emphasis on the point different from the first embodiment with same reference numerals given to the same portions as that of the aforementioned first embodiment.

Figure 6:
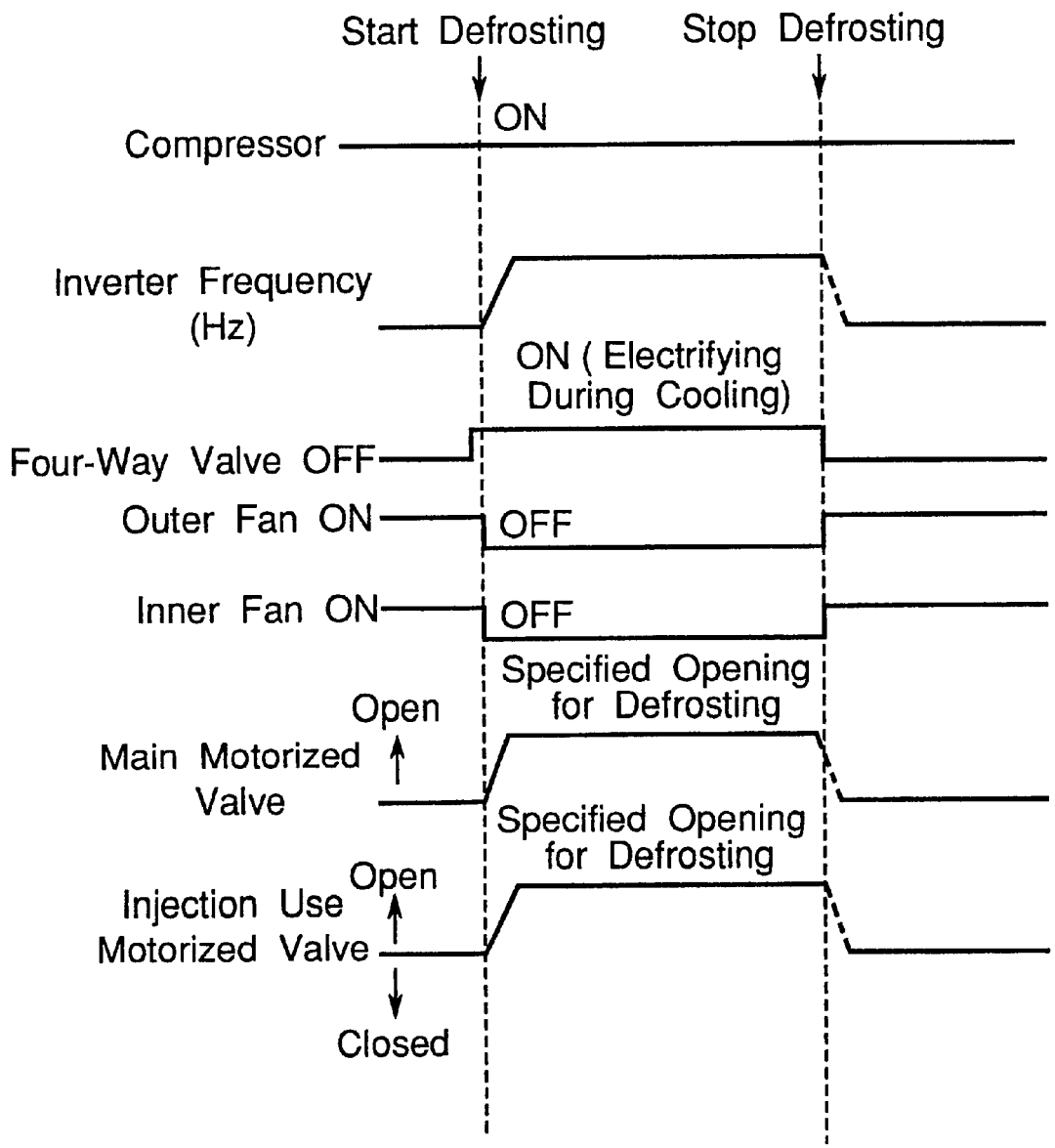
FIG. 6 is a timing chart when executing a reverse-cycle defrosting operation according to the above second embodiment.

Referring to the refrigerant circuit shown in FIG. 4 and the timing chart shown in FIG. 6, a reverse-cycle defrosting operation to be executed by interrupting the heating operation due to the frost generated on the outdoor heat exchanger 3 will be described. An operation for injecting a liquid refrigerant from the injection pipe 22 into the compressor 1 by opening the injection use motorized expansion valve 16 during this reverse-cycle defrosting operation will also be described.

In the heating operation, the four-way control valve 2 is made to have its communicating path indicated by the dashed lines. In this second embodiment, it is assumed that the four-way control valve 2 is of the type that comes to have its communicating path indicated by the dashed lines when turned off and have its communicating path indicated by the solid lines when turned on. In this heating operation, an outer fan 103 located on the outdoor heat exchanger 3 side and an inner fan 105 located on the indoor heat exchanger 6 side are operating. In this stage, the degree of opening of the main motorized valve 9 is decreased. The injection use motorized expansion valve 16 is closed.

If the control section 102 detects that frost is generated on the outdoor heat exchanger 3 during this heating operation by a temperature signal from an outside temperature sensor 106, then the four-way control valve 2 is first switched to have the communicating path indicated by the solid lines for the setting of the path in the cooling position. Immediately after this operation, the outer fan 103 and the inner fan 105 are stopped and the degrees of opening of the main motorized valve 9 and the injection use motorized expansion valve 16 are increased, thereby setting a specified degree of opening for defrosting use. Simultaneously with this operation, the control section 102 increases the frequency of the inverter 101 so as to increase the output of the compressor 1. By this operation, the apparatus starts the reverse-cycle defrosting operation.

Figure 5:
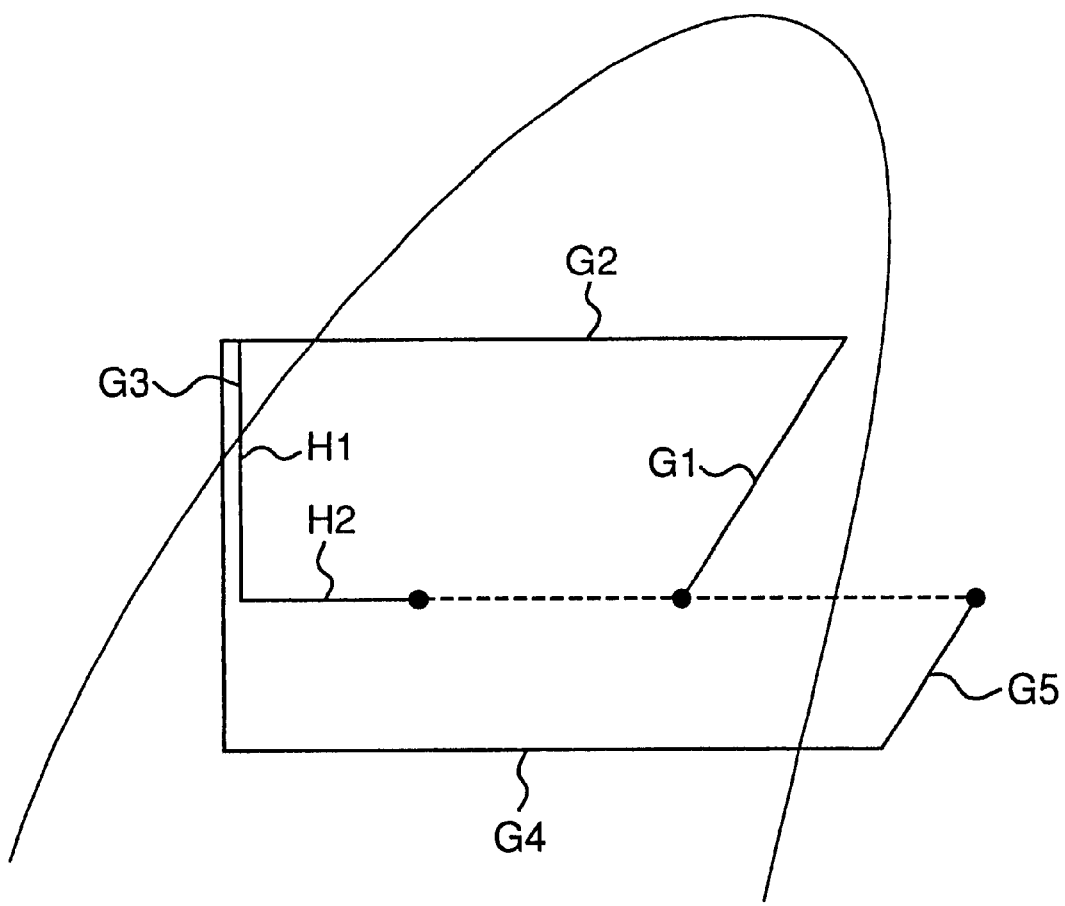
FIG. 5 is a Mollier chart when liquid injection is executed in the above second embodiment.

In this reverse-cycle defrosting operation, the refrigerant discharged from the compressor 1 is condensed by the outdoor heat exchanger 3 to melt the frost on the outdoor heat exchanger 3 and thereafter made to flow from the junction P1 into the supercooling heat exchanger 15 by way of the check valve 11 of the rectifier circuit 5. The main-stream refrigerant flowing into the supercooling heat exchanger 15 exchanges heat with the bypass-flow refrigerant flowing through the inner pipe 21 and then flows into the main motorized valve 9. Then, after expanding in this main expansion valve 9, the main-stream refrigerant returns to the inlet side of the compressor 1 through the indoor heat exchanger 6. The change of state of the main-stream refrigerant in this reverse-cycle defrosting operation is indicated by the line segments G1, G2, G3, G4 and G5 of the Mollier chart shown in FIG. 5.

On the other hand, the bypass-flow refrigerant passes from the junction P1 through the injection use motorized expansion valve 16 of which the degree of opening is great and passes through the inner pipe 21 and the injection pipe 22 in a small-dryness state in which a great amount of liquid refrigerant is contained so as to be injected into the intermediate-pressure portion 1a of the compressor 1. The change of state of the bypass-flow refrigerant in this reverse-cycle defrosting operation is indicated by the line segments H1 and H2 of the Mollier chart of FIG. 5. As described above, by setting the degree of opening of the injection use motorized expansion valve 16 great, the length of the line segment H2 can be shortened to allow the refrigerant that contains a great amount of liquid refrigerant and has small dryness to be injected into the compressor 1.

As described above, according to this second embodiment, the bypass-flow refrigerant that has bypasses the main motorized valve 9 and the indoor heat exchanger 6 is made to return from the injection pipe 22 to the compressor 1 in the state in which a great amount of liquid refrigerant is contained. Therefore, the amount of refrigerant that is circulated from the compressor 1 to the outdoor heat exchanger 3 during the reverse-cycle defrosting operation can be increased to allow the defrosting operation to be completed in a short time. Therefore, the time during which the heating operation is interrupted can be reduced by the reverse-cycle defrosting operation, by which the comfort in heating can be improved.

Third Embodiment

Figure 7:
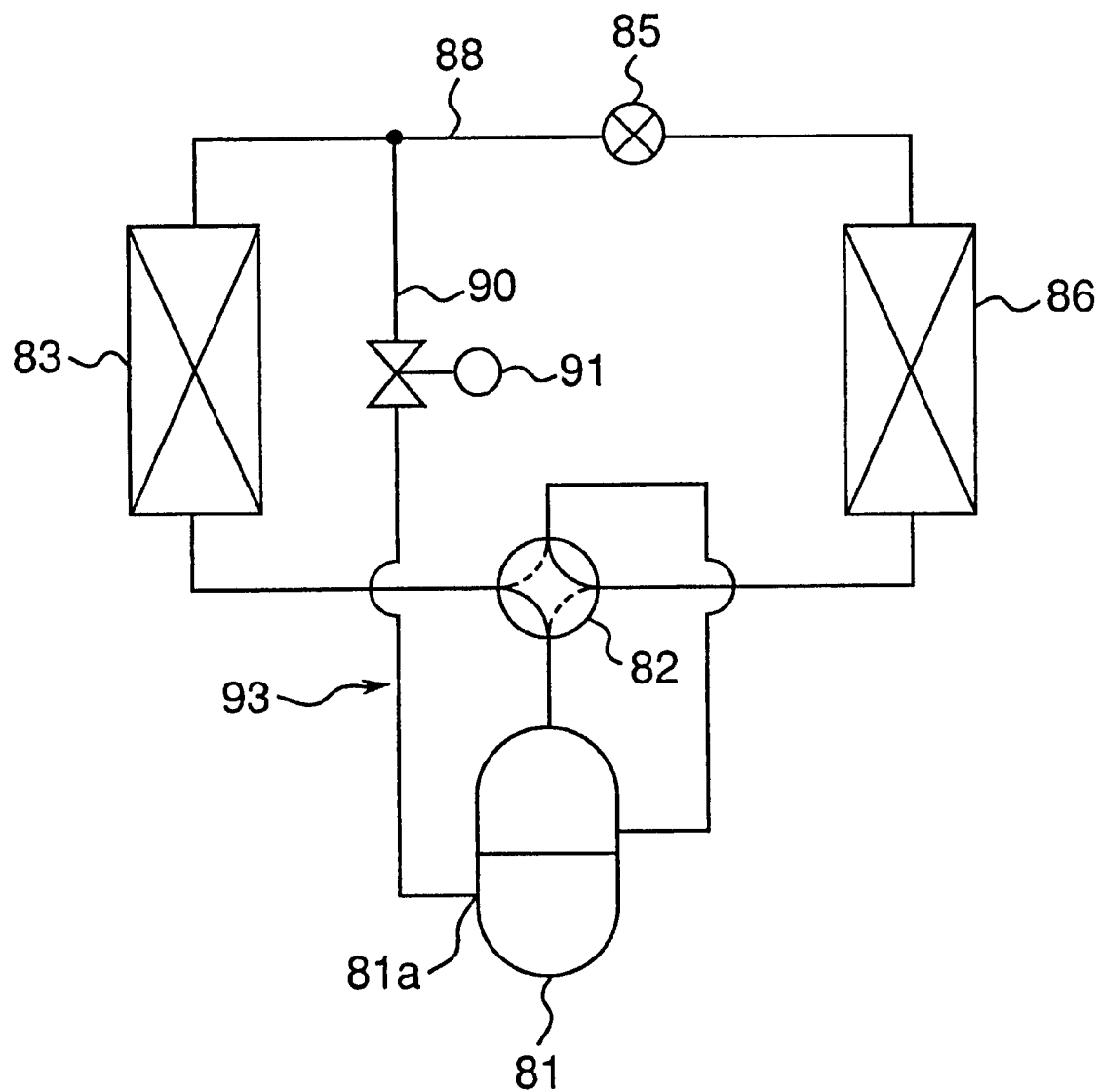
FIG. 7 is a circuit diagram of an air conditioner refrigerant circuit according to a third embodiment of the refrigerating apparatus of the present invention.
Figure 8:
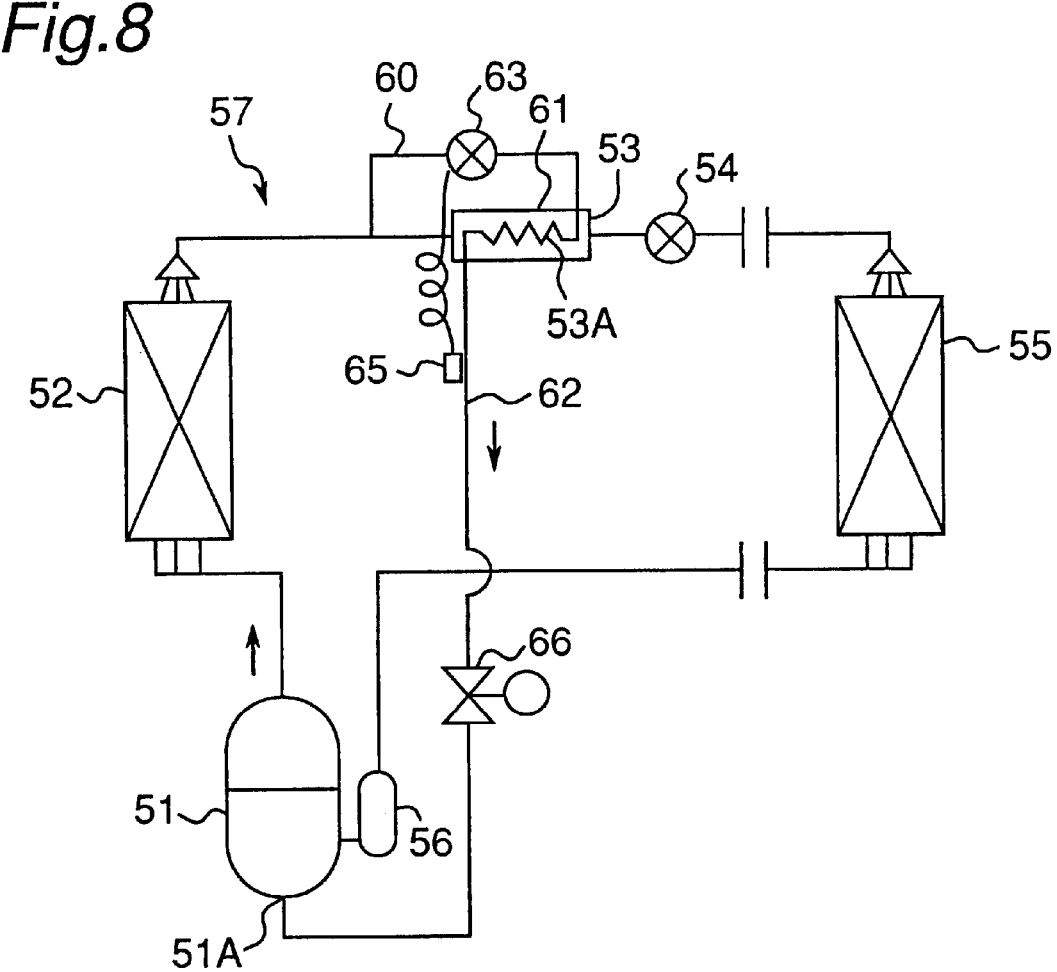
FIG. 8 is a circuit diagram of the refrigerant circuit of a conventional refrigerating apparatus.
Figure 9:
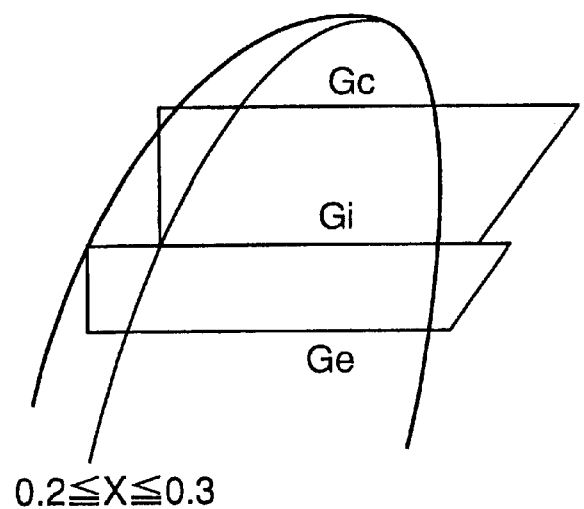
FIG. 9 is a Mollier chart of the gas injection cycle of the above conventional refrigerating apparatus.
Figure 10:
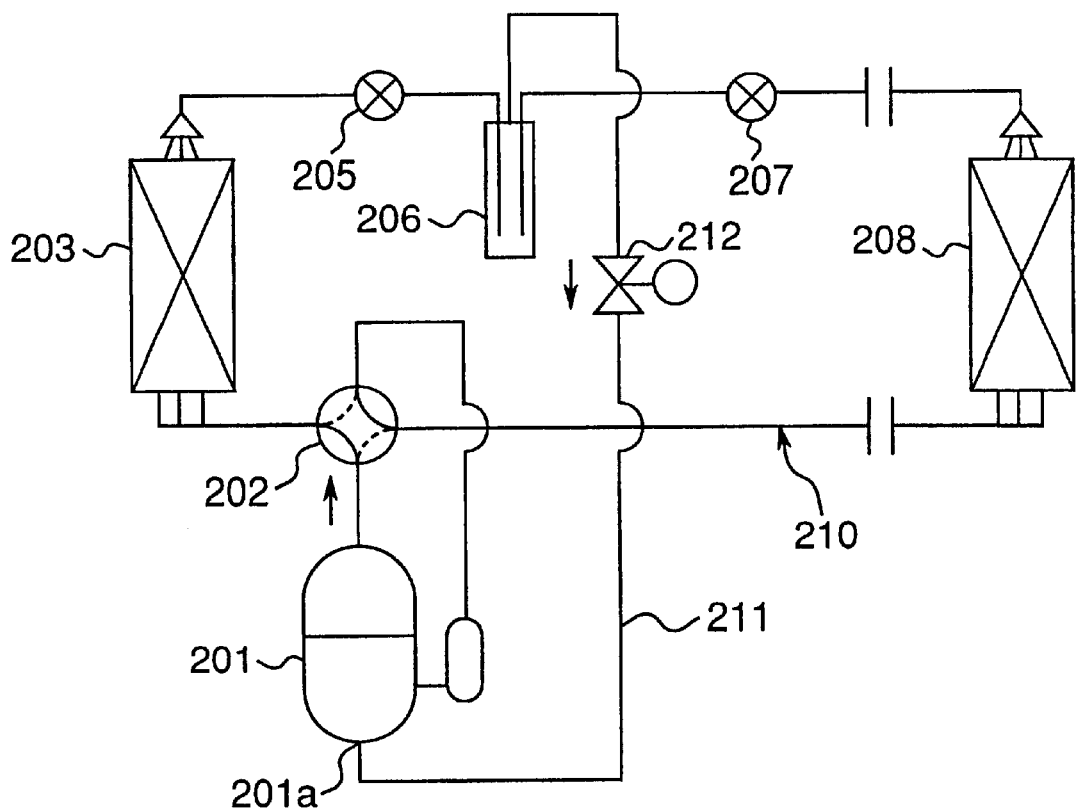
FIG. 10 is a circuit diagram of the refrigerant circuit of another conventional refrigerating apparatus that executes gas injection.
Figure 11:
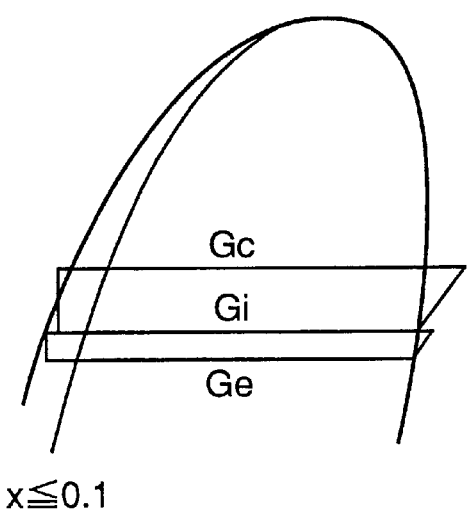
FIG. 11 is a Mollier chart when gas injection is executed during defrosting in the above conventional refrigerating apparatus.

Next, FIG. 7 shows a refrigerant circuit according to the third embodiment of the refrigerating apparatus of the present invention. This third embodiment has a refrigerant circuit in which a compressor 81, a four-way control valve 82, an outdoor heat exchanger 83, a main expansion valve 85 and an indoor heat exchanger 86 are connected in series. This refrigerant circuit has a bypass pipe 90 that connects to an intermediate-pressure portion 81a of the compressor 81 a refrigerant pipe 88 for connecting the outdoor heat exchanger 83 to the main expansion valve 85. This bypass pipe 90 is provided with a solenoid controlled valve 91. This solenoid controlled valve 91 and the bypass pipe 90 constitute a liquid injection circuit 93.

In the third embodiment having the above construction, the reverse-cycle defrosting operation is executed by switching the four-way control valve 82 to make the valve have a communicating path indicated by the solid lines when frost is generated on the outdoor heat exchanger 83 while the heating operation is executed by making the four-way control valve 82 have a communicating path indicated by the dashed lines. Then, by opening the solenoid controlled valve 91 during this reverse-cycle defrosting operation, the liquid refrigerant directed from the outdoor heat exchanger 83 toward the main expansion valve 85 can be injected from the bypass pipe 90 into the intermediate-pressure portion 81a of the compressor 81 while bypassing the main expansion valve 85 and the indoor heat exchanger 86. By this operation, the amount of refrigerant to be circulated from the compressor 81 to the outdoor heat exchanger 83 during the reverse-cycle defrosting operation can be increased. Therefore, the defrosting operation can be completed in a short time. Therefore, the time during which the heating operation is interrupted can be reduced by the reverse-cycle defrosting operation, by which the comfort in heating can be improved.

INDUSTRIAL APPLICABILITY

As described above, the refrigerating apparatus of the present invention can be applied to a refrigerating apparatus provided with an injection circuit and is useful particularly in making the injection circuit silent at low cost. The refrigerating apparatus is further useful in reducing the reverse-cycle defrosting time by using the injection circuit and improving the comfort.

What is claimed is:

1. A refrigerating apparatus that includes a compressor, a condenser, a main expansion mechanism, an evaporator and a supercooling circuit having a supercooling heat exchanger provided between the condenser and the main expansion mechanism and includes an injection circuit for injecting a gas refrigerant from the supercooling heat exchanger into an intermediate-pressure portion of the compressor, the apparatus comprising:

a motorized expansion valve provided in a supercooling pipe that diverges from a main flow on the upstream side of the supercooling heat exchanger, and which reaches the supercooling heat exchanger.

2. A refrigerating apparatus as claimed in claim 1, comprising:

a first opening control section for setting the motorized expansion valve to a small degree of opening which is close to a completely closed state when the injection circuit is substantially stopping its operation.

3. A refrigerating apparatus as claimed in claim 1, comprising:

a rectifier circuit for flowing the refrigerant sequentially into the condenser, the supercooling heat exchanger and the main expansion mechanism both in a cooling operation and a heating operation.

4. A refrigerating apparatus as claimed in claim 1, comprising:

a second opening control section for controlling the degree of opening of the motorized expansion valve to increase or decrease the degree of opening according to a refrigerant temperature of the injection circuit.

5. A refrigerating apparatus that includes a compressor, a condenser, a main expansion mechanism, an evaporator and a supercooling circuit provided between the condenser and the main expansion mechanism and includes an injection circuit for injecting a gas refrigerant from the supercooling circuit into an intermediate-pressure portion of the compressor, the apparatus comprising:

a motorized expansion valve provided in a supercooling pipe that diverges from a main flow on the upstream side of the supercooling circuit, and which reaches the supercooling circuit.

6. A refrigerating apparatus as claimed in claim 5, for controlling an output of the compressor by an inverter, the apparatus comprising:

a control means for turning on an injecting operation of the injection circuit by opening the motorized expansion; valve when the compressor comes to have an operating frequency being not lower than a specified operating frequency.

* * * * *